(12) United States Patent
Sakumoto

(10) Patent No.: US 10,724,463 B2
(45) Date of Patent: Jul. 28, 2020

(54) NOX SENSOR INSPECTION PROGRAM, VEHICLE INSPECTION EQUIPMENT, NOX SENSOR INSPECTION METHOD, AND RECORDING MEDIUM

(71) Applicant: ISUZU MOTORS LIMITED, Shinagawa-ku, Tokyo (JP)

(72) Inventor: Kouji Sakumoto, Yokohama (JP)

(73) Assignee: ISUZU MOTORS LIMITED, Shinagawa-ku, Tokyo (JP)

( * ) Notice: Subject to any disclaimer, the term of this patent is extended or adjusted under 35 U.S.C. 154(b) by 277 days.

(21) Appl. No.: 15/577,170

(22) PCT Filed: May 23, 2016

(86) PCT No.: PCT/JP2016/065190
§ 371 (c)(1),
(2) Date: Nov. 27, 2017

(87) PCT Pub. No.: WO2016/190279
PCT Pub. Date: Dec. 1, 2016

(65) Prior Publication Data
US 2018/0179978 A1    Jun. 28, 2018

(30) Foreign Application Priority Data
May 28, 2015    (JP) ................................ 2015-108600

(51) Int. Cl.
*F02D 41/22* (2006.01)
*F02D 41/02* (2006.01)
(Continued)

(52) U.S. Cl.
CPC ....... *F02D 41/222* (2013.01); *B01D 53/9418* (2013.01); *B01D 53/9431* (2013.01);
(Continued)

(58) Field of Classification Search
None
See application file for complete search history.

(56) References Cited

U.S. PATENT DOCUMENTS 9,010,087 B1 * 4/2015 Upadhyay ............... F01N 11/00
60/277
9,109,493 B2 * 8/2015 Lin ......................... F01N 3/208
(Continued)

FOREIGN PATENT DOCUMENTS

JP    2008133780 A    6/2008
JP    2014181669 A    9/2014
(Continued)

OTHER PUBLICATIONS

International Search Report and Written Opinion for related PCT application No. PCT/JP2016/065190 dated Jul. 26, 2016. English translation for ISR provided. 12 pages.

*Primary Examiner* — Todd M Melton
(74) *Attorney, Agent, or Firm* — Procopio, Cory, Hargreaves & Savitch LLP

(57) ABSTRACT

A process of causing an engine (10) to perform high-temperature exhaust driving (D1) after urea water from an urea water injection valve (33) is not supplied to an SCR catalyst (34), and a process of causing the engine (10) to perform high-flow-rate exhaust driving (D2) after a flow rate of exhaust gas from a cylinder interior (13) is not reduced are performed on an ECU (40). A process of determining deterioration or malfunction of upstream and downstream NOx sensors (47 and 48) based on detected values (Ca and Cb) acquired when the engine speed (Na) reaches a determination speed (Nx) is performed on a vehicle external computer (52).

10 Claims, 9 Drawing Sheets

(51) Int. Cl.
    *F02D 41/00*     (2006.01)
    *F02D 41/14*     (2006.01)
    *F01N 3/20*     (2006.01)
    *F01N 11/00*     (2006.01)
    *F01N 3/08*     (2006.01)
    *F01N 3/023*     (2006.01)
    *B01D 53/94*     (2006.01)
    *G01N 27/416*     (2006.01)
    *G07C 5/08*     (2006.01)

(52) U.S. Cl.
    CPC ......... *B01D 53/9495* (2013.01); *F01N 3/023* (2013.01); *F01N 3/0814* (2013.01); *F01N 3/0885* (2013.01); *F01N 3/2066* (2013.01); *F01N 3/2073* (2013.01); *F01N 11/00* (2013.01); *F02D 41/0055* (2013.01); *F02D 41/0235* (2013.01); *F02D 41/1463* (2013.01); *G01N 27/4163* (2013.01); *G07C 5/0808* (2013.01); *G07C 5/0816* (2013.01); *B01D 53/9477* (2013.01); *B01D 2255/904* (2013.01); *B01D 2258/012* (2013.01); *F01N 2560/026* (2013.01); *F01N 2900/0416* (2013.01); *F01N 2900/1402* (2013.01); *F01N 2900/1404* (2013.01); *F02D 41/1441* (2013.01); *F02D 2200/604* (2013.01); *Y02A 50/2325* (2018.01); *Y02T 10/24* (2013.01); *Y02T 10/47* (2013.01)

(56) References Cited

U.S. PATENT DOCUMENTS

| | | | |
|---|---|---|---|
| 9,678,049 B2* | 6/2017 | Lahr | F01N 3/208 |
| 9,708,960 B2* | 7/2017 | Hall | F01N 11/00 |
| 2011/0000290 A1 | 1/2011 | Sawada et al. | |

FOREIGN PATENT DOCUMENTS

| | | |
|---|---|---|
| JP | 2015001206 A | 1/2015 |
| WO | 2009141918 A1 | 11/2009 |
| WO | 2013152780 A1 | 10/2013 |

* cited by examiner

NOX SENSOR INSPECTION PROGRAM, VEHICLE INSPECTION EQUIPMENT, NOX SENSOR INSPECTION METHOD, AND RECORDING MEDIUM

CROSS-REFERENCE TO RELATED APPLICATIONS

This application is a U.S. National Stage entry of PCT Application No: PCT/JP2016/065190 filed May 23, 2016, which claims priority to the Japanese Patent Application No: JP 2015-108600 filed May 28, 2015, the contents of which are incorporated herein by reference.

TECHNICAL FIELD

The present invention relates to a NOx sensor inspection program, vehicle inspection equipment, a NOx sensor inspection method, and a recording medium, and more particularly to a NOx sensor inspection program, vehicle inspection equipment, a NOx sensor inspection method, and a recording medium which accurately determine deterioration or malfunction of a NOx sensor to prevent the NOx sensor subjected to neither deterioration nor malfunction from being replaced by mistake, and suppress a reduction in operating rate of a vehicle which is associated with the deterioration or the malfunction of the NOx sensor.

BACKGROUND ART

Diesel engines detect a NOx (nitrogen oxide) concentration in exhaust gas with a NOx sensor that is disposed on an exhaust passage to purify NOx in the exhaust gas, and perform adjustment of an injection quantity of urea water and self-diagnosis of a catalyst or the like based on the detected value.

As a device for diagnosing deterioration or malfunction of the NOx sensor, a device for diagnosing deterioration or malfunction of a NOx sensor by comparing NOx concentrations before and behind a reduction catalyst, after supply of a reductant used for the reduction catalyst is stopped is proposed (For example, see Patent Literature 1).

This device diagnoses the deterioration or the malfunction of the NOx sensor during traveling of a vehicle. However, in the diagnosis during the traveling of the vehicle, even when the supply of the reductant is stopped, there is an influence of a reduction action of the reduction catalyst due to a reductant remaining in the exhaust passage or a reductant adsorbed on the reduction catalyst, and it is difficult for the NOx concentrations before and behind the reduction catalyst to be approximately matched with each other. For this reason, in the malfunction diagnosis of the NOx sensor in the device, the diagnosis cannot be performed with high accuracy, and there is a concern that the NOx sensor subjected to neither deterioration nor malfunction is replaced by mistake.

CITATION LIST

Patent Literature

[Patent Literature 1]: JP-A-2008-133780

SUMMARY OF INVENTION

Technical Problem

This disclosure was made in view of the above problems, an object thereof is to provide a NOx sensor inspection program, vehicle inspection equipment, a NOx sensor inspection method, and a recording medium which accurately determine deterioration or malfunction of a NOx sensor to prevent the NOx sensor subjected to neither deterioration nor malfunction from being replaced by mistake, and suppress a reduction in operating rate of a vehicle which is associated with the deterioration or the malfunction of the NOx sensor.

Solution to Problem

A NOx sensor inspection program according to this disclosure for solving the above problems is configured such that, during inspection of a vehicle in which an internal combustion engine, in which an upstream NOx sensor and a downstream NOx sensor are disposed upstream and downstream from a reduction catalyst disposed in an exhaust passage, and an in-vehicle computer, which is connected to each of the upstream and downstream NOx sensors, are mounted, deterioration or malfunction of each of the upstream and downstream NOx sensors is inspected, wherein: the NOx sensor inspection program is stored in a vehicle external computer that is connected to the in-vehicle computer via a communication device; the NOx sensor inspection program causes the in-vehicle computer to execute the high-temperature exhaust driving process of performing high-temperature exhaust driving for setting a temperature of exhaust gas to be higher than or equal to a predetermined high temperature on the internal combustion engine after a reductant from a reductant injection valve is not supplied to the reduction catalyst, and to execute the high-flow-rate exhaust driving process of performing high-flow-rate exhaust driving for setting a speed of internal combustion engine to be more than or equal to a predetermined high speed on the internal combustion engine after a flow rate of the exhaust gas is not reduced; and the NOx sensor inspection program causes the vehicle external computer to execute a determining process of acquiring detected values of the upstream and downstream NOx sensors when the speed of internal combustion engine is the predetermined determination speed, and determining the deterioration or the malfunction of the upstream and downstream NOx sensors based on the detected values.

Vehicle inspection equipment according to this disclosure for solving the above problems includes the vehicle external computer in which the NOx sensor inspection program described above is recorded.

A NOx sensor inspection method according to this disclosure for solving the above problems is configured such that, during inspection of a vehicle in which an internal combustion engine, in which an upstream NOx sensor and a downstream NOx sensor are disposed upstream and downstream from a reduction catalyst disposed in an exhaust passage, and an in-vehicle computer, which is connected to each of the upstream and downstream NOx sensors, are mounted, deterioration or malfunction of each of the upstream and downstream NOx sensors is inspected, and includes steps of: using driving of the internal combustion engine as high-temperature exhaust driving for setting a temperature of exhaust gas to be higher than or equal to a predetermined high temperature after a reductant from a reductant injection valve is not supplied to the reduction catalyst; using driving of the internal combustion engine as high-flow-rate exhaust driving for setting a speed of internal combustion engine to be more than or equal to a predetermined high speed after a flow rate of the exhaust gas is not reduced; acquiring detected values of the upstream and downstream NOx sensors when the speed of internal combustion engine is the predetermined determination speed; and determining the deterioration or the malfunction of the upstream and downstream NOx sensors based on the detected values.

A recording medium according to this disclosure for solving the above problems is configured such that, during inspection of a vehicle having an upstream NOx sensor disposed upstream from a reduction catalyst disposed in an exhaust passage of an internal combustion engine, a downstream NOx sensor disposed downstream from the reduction catalyst, and an ECU connected to the upstream and downstream NOx sensors, a computer program for a vehicle external computer connected to the ECU is recorded, wherein the computer program causes the vehicle external computer to perform processes below when performed on the vehicle external computer:

controlling the ECU to perform, on the ECU, a high-temperature exhaust driving process of causing the internal combustion engine to perform high-temperature exhaust driving for setting a temperature of exhaust gas to be higher than or equal to a predetermined high temperature after a reductant from a reductant injection valve is not supplied to the reduction catalyst;

controlling the ECU to perform, on the ECU, a high-flow-rate exhaust driving process of causing the internal combustion engine to perform high-flow-rate exhaust driving for setting a speed of internal combustion engine to be more than or equal to a predetermined high speed after a flow rate of the exhaust gas is not reduced after the high-temperature exhaust driving process is performed;

acquiring detected values of the upstream and downstream NOx sensors when the speed of internal combustion engine is the predetermined determination speed after the high-flow-rate exhaust driving process is performed on the ECU; and determining deterioration or malfunction of the upstream and downstream NOx sensors based on the detected values.

Advantageous Effects of the Invention

According to the NOx sensor inspection program, the vehicle inspection equipment, the NOx sensor inspection method, and the recording medium relating to this disclosure, an internal combustion engine performs high-temperature exhaust driving after a reductant is not supplied to a reduction catalyst, and then the internal combustion engine performs high-flow-rate exhaust driving after discharged exhaust gas is not reduced. Thereby, circumstances under which no reduction action occurs under the reduction catalyst, that is, circumstances under which NOx concentrations before and behind the reduction catalyst are nearly matched with each other are produced. Under such circumstances, when a speed of the internal combustion engine becomes a preset determination speed, detected values of upstream and downstream NOx sensors are acquired, and deterioration or malfunction of the NOx sensors is determined based on the detected values. Thus, accuracy of the determination of the deterioration or malfunction of the NOx sensors can be improved, and the NOx sensors subjected to neither deterioration nor malfunction can be prevented from being replaced by mistake. In addition, the determination of the deterioration or malfunction of the NOx sensors is performed with high accuracy, and thereby preventive maintenance of the NOx sensors is advanced. For this reason, a reduction in operating rate of a vehicle which is associated with the deterioration or the malfunction of the NOx sensors can be suppressed.

DESCRIPTION OF EMBODIMENTS

Figure 1:
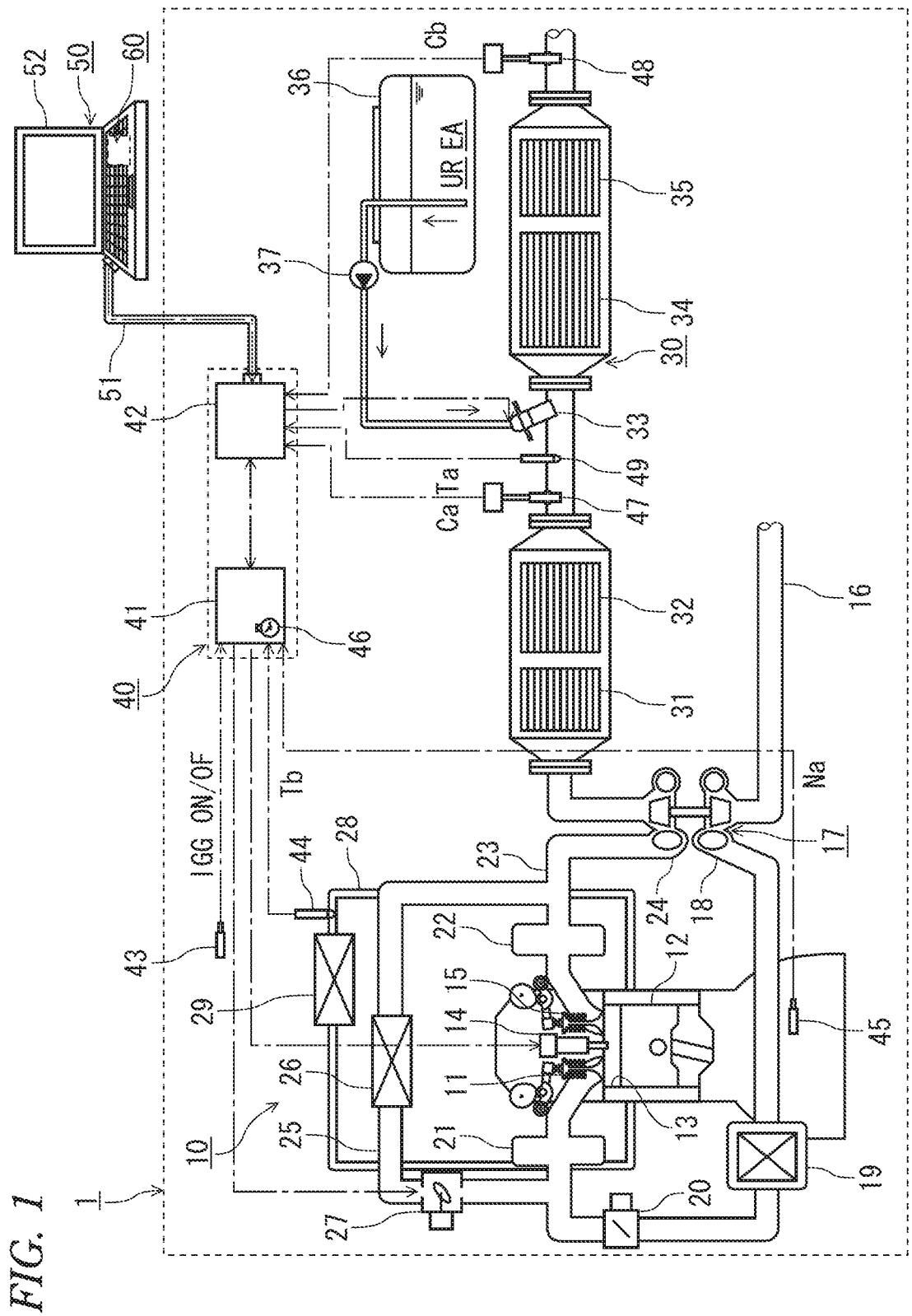
FIG. 1 is an explanatory diagram illustrating an embodiment of a NOx sensor inspection program.

Hereinafter, a NOx sensor inspection program and a vehicle inspection equipment, and a NOx sensor inspection method according to this disclosure will be described. FIG. 1 illustrates a relation between arrangement of upstream and downstream NOx sensors 47 and 48 and an inspection program 60 for the sensors. The inspection program 60 is a program that is stored in a vehicle external computer 52 provided for vehicle inspection equipment 50 and inspects deterioration of the upstream and downstream NOx sensors 47 and 48 disposed on an exhaust passage 23 of an engine 10 of a vehicle 1. A service station such as a gas station may be illustrated as the vehicle inspection equipment 50.

As illustrated in FIG. 1, the vehicle 1 is a vehicle which stops at the vehicle inspection equipment 50 and on which inspection and maintenance are performed.

The engine 10 mounted in the vehicle 1 mixes intake air, which is suctioned from an intake valve 11 into a cylinder interior 13 in which a piston 12 reciprocates, and light oil, which is injected from a fuel injection valve 14 into the cylinder interior 13, for instance, during traveling of the vehicle, and burns the mixture to exhaust the exhaust gas after being burned from an exhaust valve 15.

The intake air is suctioned from the outside into an intake passage 16, is compressed to be heated to a high temperature by a compressor 18 of a turbocharger 17, and is cooled by an intercooler 19. Afterwards, the intake air is subjected to adjustment of a flow rate by an intake throttle 20, and is suctioned from the intake valve 11 into the cylinder interior 13 via an intake manifold 21.

The exhaust gas is exhausted from an exhaust manifold 22 into an exhaust passage 23 via the exhaust valve 15 from the cylinder interior 13, and drives a turbine 24 of the turbocharger 17. Afterwards, the exhaust gas is purified by an exhaust emission control system 30, and is discharged to an atmosphere. Some of the exhaust gas is cooled by an exhaust gas recirculation (EGR) cooler 26 provided in an EGR passage 25, is supplied to the intake passage 16 by an EGR valve 27, and is mixed with the intake air.

The engine 10 is cooled by a coolant that is cooled by a radiator 29 provided for a cooling circuit 28.

An oxidation catalyst 31, a trapping device 32, a urea water injection valve 33, a selective catalytic reduction (SCR) catalyst (a reduction catalyst) 34, and an ammonia slip catalyst 35 are disposed in the exhaust emission control system 30 from upstream toward downstream in this order.

When the exhaust gas passes through the exhaust emission control system 30, unburned hydrocarbon and carbon monoxide in the exhaust gas are oxidized by the oxidation catalyst 31, and nitric monoxide is oxidized to produce nitrogen dioxide. Next, in the trapping device 32, nitric monoxide is oxidized to produce nitrogen dioxide by a supported catalyst, and fine particulate matter in the exhaust gas is trapped. In the trapping device 32, the trapped fine particulate matter and the nitrogen dioxide react with each other, and the fine particulate matter is oxidized and removed. Next, in the SCR catalyst 34, nitrogen oxides in the exhaust gas whose temperature is raised by an oxidation reaction of the oxidation catalyst 31 and the trapping device 32 are reduced by SCR reactions caused by ammonia generated by hydrolysis of urea water injected from the urea water injection valve 33. Next, in the ammonia slip catalyst 35, the ammonia passing through the SCR catalyst 34 is removed. The urea water injected from the urea water injection valve 33 is stored in a urea water tank 36. The urea water stored in the urea water tank 36 is fed under pressure by a pressure pump 37, and is transported to the urea water injection valve 33 via a pipe.

The engine 10 is provided with an electronic control unit (ECU) 40 as a unit of an in-vehicle computer for controlling the engine 10. The ECU 40 has an engine controller (hereinafter referred to as an engine control module (ECM)) 41 that controls the fuel injection valve 14 to adjust an injection quantity and injection timing of fuel and maintains the engine 10 in a given driving state, or a dosing control unit (DCU) 42 that controls the urea water injection valve 33 in the exhaust emission control system 30 to adjust injection of the urea water.

The ECM 41 is connected to an ignition ON sensor 43, a water temperature sensor 44, and an engine speed sensor 45, and includes a timer 46 that measures duration of the given driving state of the engine 10. The DCU 42 is connected to the upstream NOx sensor 47 disposed upstream from the SCR catalyst 34, the downstream NOx sensor 48 disposed downstream from the SCR catalyst 34, and an exhaust temperature sensor 49 disposed upstream from the SCR catalyst 34. Each sensor provided for the engine 10 is an example, and the embodiment is not limited to this configuration.

In the upstream and downstream NOx sensors 47 and 48, either deterioration or malfunction may be simply determined during traveling of the vehicle 1, but the determination during the traveling has low accuracy because a residual volume of the ammonia in the SCR catalyst 34 cannot be zero, that is, a reduction action in the SCR catalyst 34 cannot be zero. For this reason, when the sensor is replaced according to the determination during the traveling using the vehicle inspection equipment 50, there is a concern that the sensor subjected to neither deterioration nor malfunction is replaced by mistake.

Therefore, the NOx sensor inspection program 60 of this disclosure is a program stored in the vehicle external computer 52, and is configured to determine the deterioration or the malfunction of each of the upstream and downstream NOx sensors 47 and 48 when the vehicle 1 is inspected by the vehicle inspection equipment 50 rather than during the traveling of the vehicle 1.

The vehicle external computer 52 is configured of a computer that is connected to the DCU 42 by a communication device 51 and can mutually transmit and receive data, and has a CPU, a memory, a storage medium, an input device, and an output device. The communication device 51 may include an optical cable, a coaxial cable, a TP cable, a serial cable, a parallel cable, or the like, by way of example. Since the upstream and downstream NOx sensors 47 and 48 are connected to the DCU 42, the vehicle external computer 52 is connected to the upstream and downstream NOx sensors 47 and 48 via the DCU 42 and the communication device 51.

Figure 2:
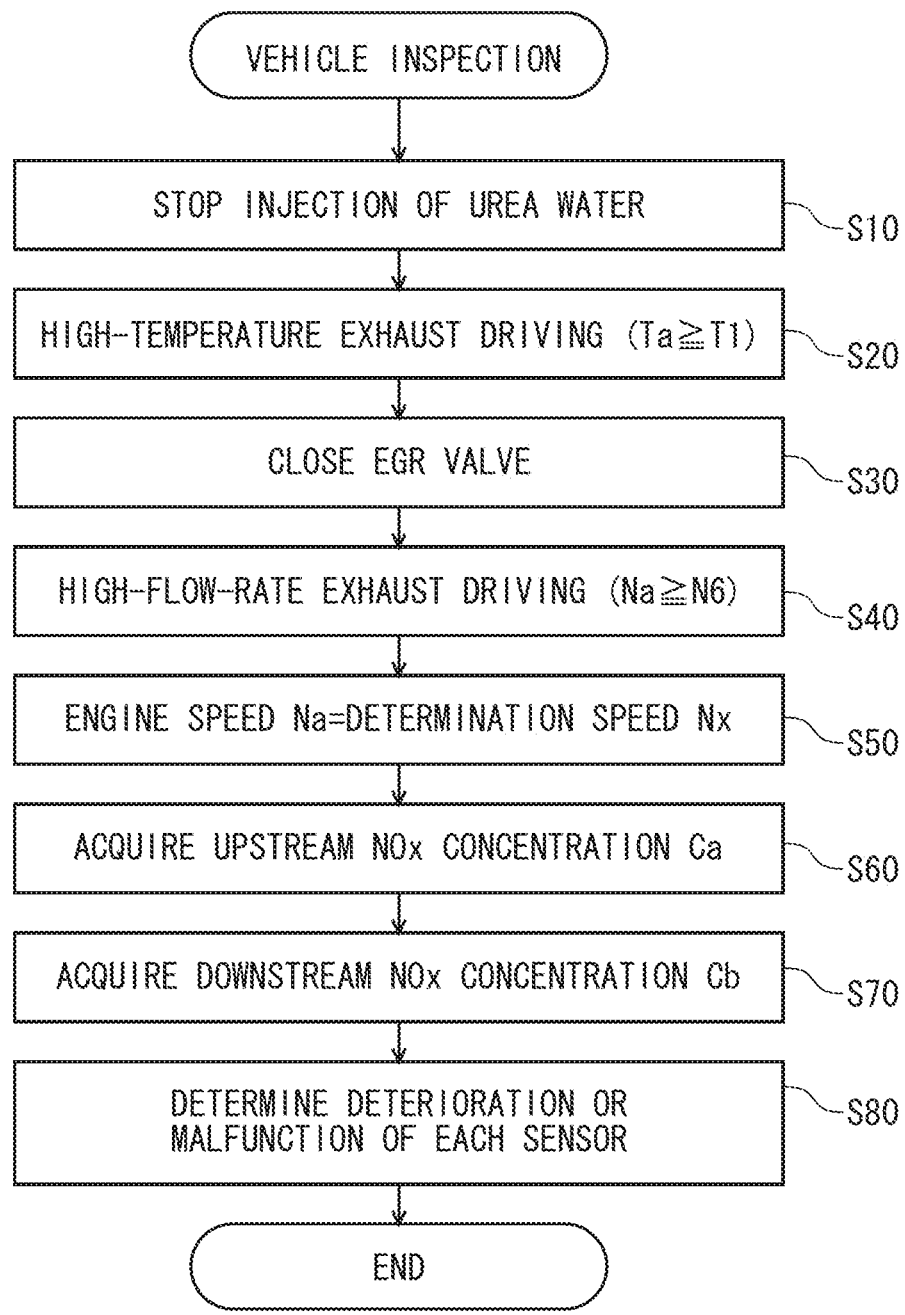
FIG. 2 is a flow chart illustrating an example of an embodiment of a NOx sensor inspection method.

As illustrated in FIG. 2, the inspection program 60 gives instructions to the ECU 40 from the vehicle external computer 52, and carries out steps S10 to S40. That is, in step S10, a process of stopping the injection of the urea water from the urea water injection valve 33 is performed on the DCU 42 of the ECU 40. After the urea water from the urea water injection valve 33 is not supplied to the SCR catalyst 34, a high-temperature exhaust driving process of performing high-temperature exhaust driving D1 for which a temperature Ta of the exhaust gas is set to be higher than or equal to a predetermined high temperature T1 in step S20 is performed on the engine 10. Next, in step S30, a process of closing the EGR valve 27 is performed on the ECM 41. After a flow rate of the exhaust gas from the cylinder interior 13 is not reduced, a high-flow-rate exhaust driving process of performing high-flow-rate exhaust driving D2 for which an engine speed Na is set to be faster than or equal to a predetermined high speed N6 in step S40 is performed on the engine 10.

Next, an instruction is given to the ECU 40 from the vehicle external computer 52 to perform step S50. That is, in step S50, a process of setting the engine speed Na to reach a predetermined determination speed Nx is performed on the ECM 41.

Next, an instruction is given to the vehicle external computer 52 to perform steps S60 to S80. That is, when the engine speed Na reaches the determination speed Nx in step S50, a process of acquiring detected values Ca and Cb of the respective upstream and downstream NOx sensors 47 and 48 is performed by the vehicle external computer 52 in step S60 and S70, and a determining process of determining deterioration of the upstream and downstream NOx sensors 47 and 48 based on the detected values Ca and Cb by the vehicle external computer 52 is performed in step S80.

The state in which the urea water from the urea water injection valve 33 is not supplied to the SCR catalyst 34 refers to a state in which new ammonia is not adsorbed on the SCR catalyst 34. This state may include, for example, a state in which the urea water injection valve 33 is removed for inspection of the vehicle 1 or a state in which electronic control signal lines connected to the DCU 42 are removed from the urea water injection valve 33 in addition to a state in which the injection of the urea water from the urea water injection valve 33 is stopped by the DCU 42.

The high-temperature exhaust driving D1 is driving for which the temperature Ta of the exhaust gas flowing into the SCR catalyst 34 is set to be higher than or equal to the high temperature T1 set to a temperature at which the ammonia adsorbed on the SCR catalyst 34 is desorbed, that is, driving for which the temperature Ta acquired by the exhaust temperature sensor 49 disposed downstream from the trapping device 32 and upstream from the SCR catalyst 34 is set to be higher than or equal to the high temperature T1. The high-temperature exhaust driving D1 may include, for example, driving during reproduction control for burning and removing the particulate matter trapped by the trapping device 32 to reproduce the trapping device 32, or driving during function recovery control for burning and removing a white product attached to the SCR catalyst 34 to recover a function of the SCR catalyst 34. Especially the ECM 41 executes the reproduction control of the trapping device 32 or the function recovery control of the SCR catalyst 34, for instance, during the traveling. To this end, these controls are programmed. When the controls are executed as the high-temperature exhaust driving D1, this is preferable because the controls can be simplified.

The high temperature T1 may include, for example, a value of 400 degrees or higher and 500 degrees or lower. When the high temperature T1 is set to a value that is lower than 400 degrees, the ammonia adsorbed on the SCR catalyst 34 cannot be sufficiently desorbed. Meanwhile, when the high temperature T1 is set to a value exceeding 500 degrees, there is a concern that the temperature of the exhaust gas exceeds a temperature that can be allowed by the SCR catalyst 34, and durability of the SCR catalyst 34 is reduced.

The state in which the flow rate of the exhaust gas from the cylinder interior 13 is not reduced refers to a state in which the exhaust gas does not flow back from the exhaust passage 23 to the intake passage 16 via the EGR passage 25, that is, a state in which the EGR valve 27 is closed and the EGR passage 25 is blocked. This state may include a state in which electronic control signal lines connected to the ECM 41 for the inspection of the vehicle 1 are removed from the closed EGR valve 27 in addition to a state in which the EGR valve 27 is closed by the ECM 41.

The high-flow-rate exhaust driving D2 is driving for which a flow rate of the NOx in the exhaust gas is increased to rapidly discharge the ammonia remaining in the exhaust passage 23, that is, driving for which the engine speed Na is set to be faster than or equal to the predetermined high speed N6. The high-flow-rate exhaust driving D2 may include driving for which the engine speed Na is set to a no-load highest speed N5, that is, idling driving. When the engine speed Na is set to the no-load highest speed N5, the flow rate of the exhaust gas discharged from the cylinder interior 13 is most increased, an effect of completely consuming the ammonia remaining in the exhaust passage 23 or the SCR catalyst 34 while blowing off is highest.

Figure 3:
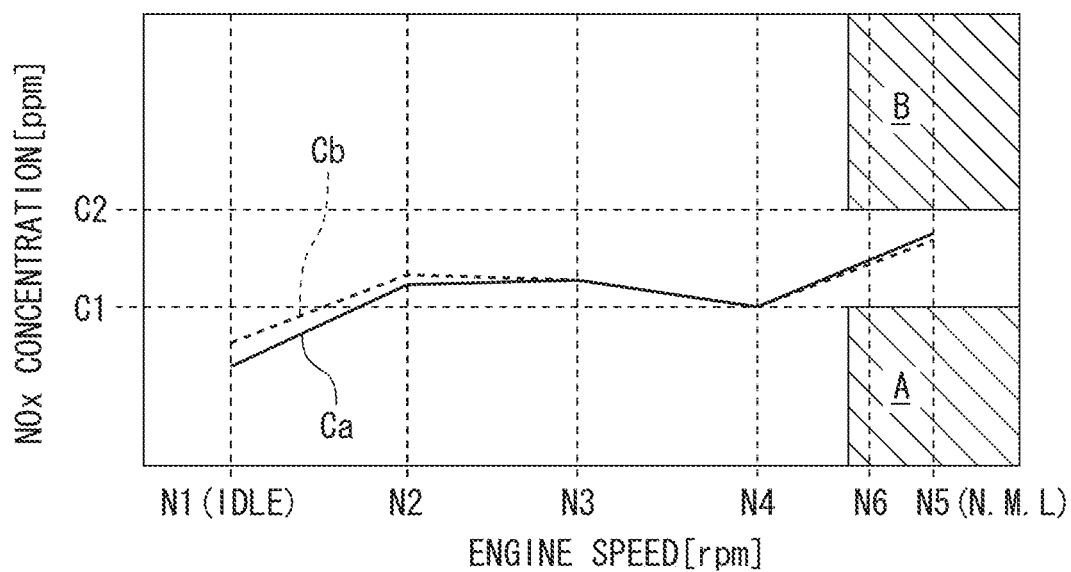
FIG. 3 is a graph illustrating an example of a relation between an internal combustion engine speed and NOx concentrations before and behind a reduction catalyst after high-flow-rate exhaust driving of FIG. 2 is completed.

As illustrated in FIG. 3, as the determination speed Nx, any one of an idle speed N1, a no-load highest speed N5, and first, second and third speeds N2, N3 and N4 set to speeds between the idle speed N1 and the no-load highest speed N5 may be selected. On the other hand, it is more preferable that the determination speed Nx is set to the plurality of speeds in the inspection program 60 and the determining process is performed on the different determination speeds Nx, because the deterioration or the malfunction of the upstream and downstream NOx sensors 47 and 48 can be determined with higher accuracy.

The process of determining the deterioration or the malfunction of the upstream and downstream NOx sensors 47 and 48 based on the detected values Ca and Cb is preferably a process of determining whether or not the detected value Ca of the upstream NOx sensor 47 is a value out of an upstream determination region A set by the detected value Cb of the downstream NOx sensor 48 when the detected value Cb of the downstream NOx sensor 48 at the determination speed Nx is less than a preset first determination value CB (Cb<CB), and whether or not the detected value Cb of the downstream NOx sensor 48 is a value out of a downstream determination region B set by the detected value Ca of the upstream NOx sensor 47 when the detected value Ca of the upstream NOx sensor 47 at the determination speed Nx exceeds a preset second determination value CA (Ca>CA).

In general, a practical form of the malfunction of the NOx sensor includes a shift toward a low sensitivity side resulting from a reduction in a function of a NOx detection electrode due to poisoning (a reduction in sensitivity) and a shift toward a high sensitivity side resulting from poor control of an oxygen concentration in the sensor due to poisoning or cracks of an element (a rise in sensitivity). Among these, especially the malfunction in which the sensitivity of the upstream NOx sensor 47 is reduced has a chance of exerting a fatal influence on a NOx purification rate because a urea injection quantity is decided according to the detected value Ca of the upstream NOx sensor 47. When the NOx purification rate is reduced, exhaust gas performance is deteriorated, and also reaches diagnostic detection caused by OBD. Thus, there is especially a need to accurately determine the malfunction of the reduction in the sensitivity of the upstream NOx sensor 47.

Therefore, when the detected value Cb of the downstream NOx sensor 48 is less than the first determination value CB, that is, after it is checked that there is no possibility of the malfunction in which the downstream NOx sensor 48 is shifted toward the high sensitivity side, it can be determined whether or not the detected value Ca of the upstream NOx sensor 47 is the value out of the upstream determination region A. That is, the detected value Ca of the upstream NOx sensor 47 and the detected value Cb of the downstream NOx sensor 48 are compared, and thereby the shift toward the low sensitivity side can be determined with respect to the upstream NOx sensor 47 with high accuracy.

Similarly, when the detected value Ca of the upstream NOx sensor 47 exceeds the second determination value CA, that is, after it is checked that there is no possibility of the malfunction in which the upstream NOx sensor 47 is shifted toward the low sensitivity side, it can be determined whether or not the detected value Cb of the downstream NOx sensor 48 is the value out of the downstream determination region B. That is, the detected value Ca of the upstream NOx sensor 47 and the detected value Cb of the downstream NOx sensor 48 are compared, and thereby the shift toward the high sensitivity side can be determined with respect to the downstream NOx sensor 48 with high accuracy.

Here, the first determination value CB is, for example, 300 ppm to 400 ppm, and the second determination value CA is, for example, 50 ppm. Each of the determination values is a determination value for checking that downstream NOx sensor 48 or the upstream NOx sensor 47 is not in a malfunction state in which the sensitivity is remarkably raised or reduced, and continuously checking that highly accurate inspection can be performed by mutual comparison.

FIG. 3 illustrates a relation between an engine speed and a NOx concentration after the high-temperature exhaust driving D1 and the high-flow-rate exhaust driving D2 are performed.

In a case in which the determination speed Nx is set to the no-load highest speed N5, the upstream determination region A becomes a region in which the NOx concentration is lower than or equal to a NOx concentration C1, and the downstream determination region B becomes a region in which the NOx concentration is higher than or equal to a NOx concentration C2. The NOx concentration C1 is a value obtained by multiplying the detected value Cb acquired by the downstream NOx sensor 48 by 0.5 to 0.9 when the engine speed Na is the no-load highest speed N5, and the NOx concentration C2 is a value obtained by multiplying the detected value Ca acquired by the upstream NOx sensor 47 by 2 to 3 when the engine speed Na is the no-load highest speed N5.

The NOx concentration is changed by an influence such as an external pressure or an external temperature. Accordingly, when the upstream and downstream NOx sensors 47 and 48 are subjected to neither deterioration nor malfunction, the detected values Ca and Cb are values that are nearly matched with each other. For this reason, the determination region for one of the detected values is set based on the other detected value, and thereby, the deterioration or the malfunction of the sensors can be determined with higher accuracy.

In a case in which the detected value Ca of the upstream NOx sensor 47 is a value within the upstream determination region A, the upstream NOx sensor 47 is determined to undergo the deterioration or the malfunction. In a case in which the detected value Cb of the downstream NOx sensor 48 is a value within the downstream determination region B, the downstream NOx sensor 48 is determined to undergo the deterioration or the malfunction.

This determining process may be a process of determining that one of the sensors is deteriorated when a difference between the detected values Ca and Cb is greater than or equal to a predetermined threshold. With regard to the comparison of the detected value Cb of the downstream NOx sensor 48, in addition to a process of determining whether or not the detected value Cb is the value out of the downstream determination region B set based on the detected value Ca of the upstream NOx sensor 47, a process of determining whether or not the detected value Cb is smaller than a predetermined constant value, for example, 400 ppm may be used.

According to the inspection program 60 and the inspection method of the upstream and downstream NOx sensors 47 and 48 which is performed by executing the inspection program 60, first, after the ammonia is not newly supplied to the SCR catalyst 34, the driving state of the engine 10 is set to the high-temperature exhaust driving D1, and thereby the ammonia adsorbed on the SCR catalyst 34 is desorbed.

Next, after the flow rate of the exhaust gas is not reduced, the driving state of the engine 10 is set to the high-flow-rate exhaust driving D2, and thereby the ammonia remaining in the exhaust passage 23 and the SCR catalyst 34 is completely consumed and discharged while being blown off by the exhaust gas of a high flow rate.

In this way, circumstances under which the reduction action caused by the ammonia is completely lost in the SCR catalyst 34 by changing the driving state of the engine 10 into two steps, that is, circumstances under which the practical NOx concentrations before and behind the SCR catalyst 34 are nearly matched with each other are produced.

Under such circumstances, when the engine speed Na becomes the determination speed Nx, the detected values Ca and Cb of the upstream and downstream NOx sensors 47 and 48 are acquired, and the deterioration or the malfunction thereof is determined based on the detected values Ca and Cb.

Accordingly, according to the inspection program 60 and the inspection method of this disclosure, since the determination is performed under the circumstances under which the practical NOx concentrations before and behind the SCR catalyst 34 are nearly matched with each other, the deterioration or malfunction of the upstream and downstream NOx sensors 47 and 48 can be determined accurately, and the upstream and downstream NOx sensors 47 and 48 can be prevented from being replaced by mistake when subjected to no malfunction. In addition, high-accuracy determination of the deterioration is performed, and thereby preventive maintenance of the upstream and downstream NOx sensors 47 and 48 in the vehicle inspection equipment 50 is advanced. Thus, a reduction in operating rate of the vehicle 1 which is associated with the malfunction of the upstream and downstream NOx sensors 47 and 48 can be suppressed.

In the inspection program 60, when the high-temperature exhaust driving D1 and the high-flow-rate exhaust driving D2 are performed on the ECM 41 of the ECU 40, elapsed times thereof are counted by the timer 46, and a process of continuing the high-temperature exhaust driving D1 until a first time t1 required to desorb the ammonia from the SCR catalyst 34 has elapsed and a process of continuing the high-flow-rate exhaust driving D2 until a second time t2 required to discharge the ammonia from the exhaust passage 23 and the SCR catalyst 34 to the outside has elapsed are preferably performed.

The first time t1 is set to a time that is preliminarily obtained by an experiment or a test. For example, the first time t1 is set to a time of 20 minutes or longer. When driving of the reproduction control of the trapping device 32 or driving of the function recovery control of the SCR catalyst 34 is used as the high-temperature exhaust driving D1, the first time t1 may be set to a control time thereof. The control time of the reproduction control of the trapping device 32 or the function recovery control of the SCR catalyst 34 is set to a time of 20 minutes or longer.

The second time t2 is set to a time that is preliminarily obtained by an experiment or a test. The second time t2 can be set based on a passage length of the exhaust passage 23 or a displacement of the engine 10, and is set to a time of, for example, 60 seconds or longer and 300 seconds or shorter. When the second time t2 is a time that is shorter than 60 seconds, the ammonia cannot be blown off from the exhaust passage 23 and the SCR catalyst 34. Meanwhile, when the second time t2 is a time that is longer than 300 seconds, a discharge time of the exhaust gas is prolonged.

Figure 4:
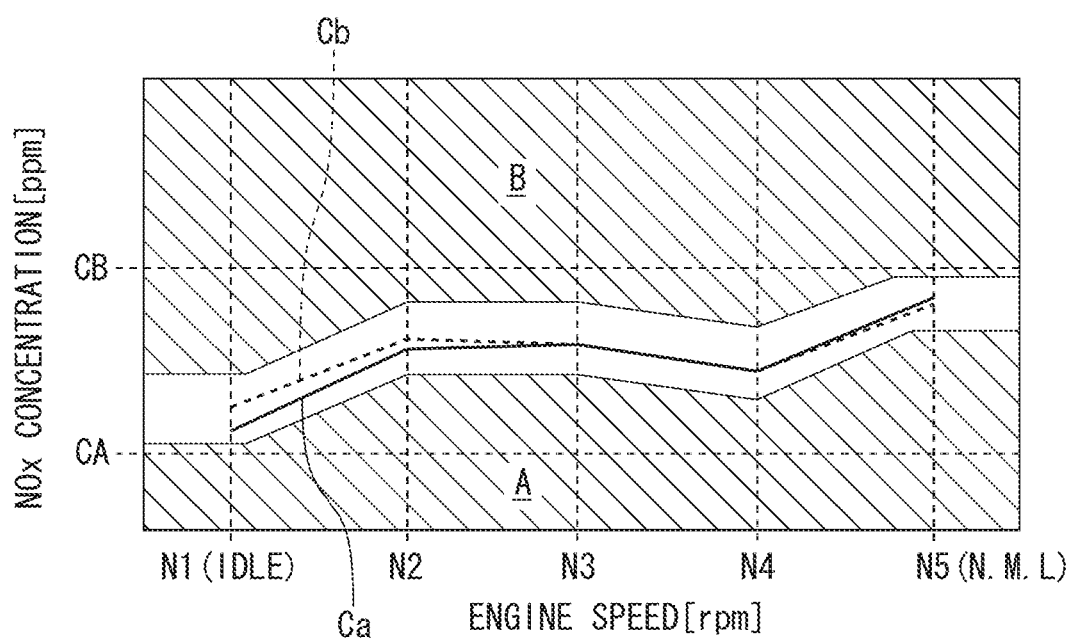
FIG. 4 is a graph illustrating another example of the relation between the internal combustion engine speed and the NOx concentrations before and behind the reduction catalyst after the high-flow-rate exhaust driving of FIG. 2 is completed.

FIG. 4 illustrates a relation between an engine speed and a NOx concentration after the high-temperature exhaust driving D1 and the high-flow-rate exhaust driving D2 are performed.

A maximum value in each speed of the upstream determination region A is set to a value obtained by multiplying the detected value Cb of the downstream NOx sensor 48 by 0.5 to 0.9 in each speed. A minimum value in each speed of the downstream determination region B is set to a value obtained by multiplying the detected value Ca of the upstream NOx sensor 47 by 2 to 3 in each speed.

In the inspection program 60, after the urea water injection valve 33 is removed from the engine 10 of the vehicle 1, the high-temperature exhaust driving D1 is preferably performed on the ECM 41.

While the high-temperature exhaust driving D1 is performed, the urea water injection valve 33 is exposed to high-temperature exhaust gas. Typically when the temperature of the exhaust gas reaches a high temperature, urea water is injected from the urea water injection valve 33, and thermal damage to the urea water injection valve 33 is prevented by the injection of the urea water. However, in the case of the configuration of this disclosure, to set the engine 10 to the high-temperature exhaust driving D1 in a state in which the injection of the urea water from the urea water injection valve 33 is stopped, the urea water injection valve 33 is removed before the engine 10 is set to the high-temperature exhaust driving D1, and thereby the thermal damage to the urea water injection valve 33 due to the high-temperature exhaust driving D1 can be avoided.

After the electronic control signal lines are removed from the EGR valve 27 of the engine 10 of the vehicle 1, the high-flow-rate exhaust driving D2 is preferably performed on the ECM 41.

Since an exhaust flow rate of the exhaust gas is increased while the high-flow-rate exhaust driving D2 is performed, some of the exhaust gas typically flows back as EGR gas by opening the EGR valve 27. However, in the case of the configuration of this disclosure, when the high-flow-rate exhaust driving D2 is not maintained in a state in which the EGR valve 27 is closed, the ammonia cannot be efficiently blown off from the exhaust passage 23 and the SCR catalyst 34. For this reason, communication between the EGR valve 27 that is in a closed state and the ECM 41 is disconnected before the engine 10 is set to the high-flow-rate exhaust driving D2, that is, the electronic control signal lines are removed from the EGR valve 27, and thereby the flow rate of the exhaust gas can be prevented from being reduced in the high-flow-rate exhaust driving D2.

The inspection method according to the inspection program 60 will be described with reference to flow charts illustrated in FIGS. 5 to 9. This inspection method is a method performed when the vehicle 1 is inspected in the vehicle inspection equipment 50. A double line of FIG. 7 indicates parallel processing.

Figure 5:
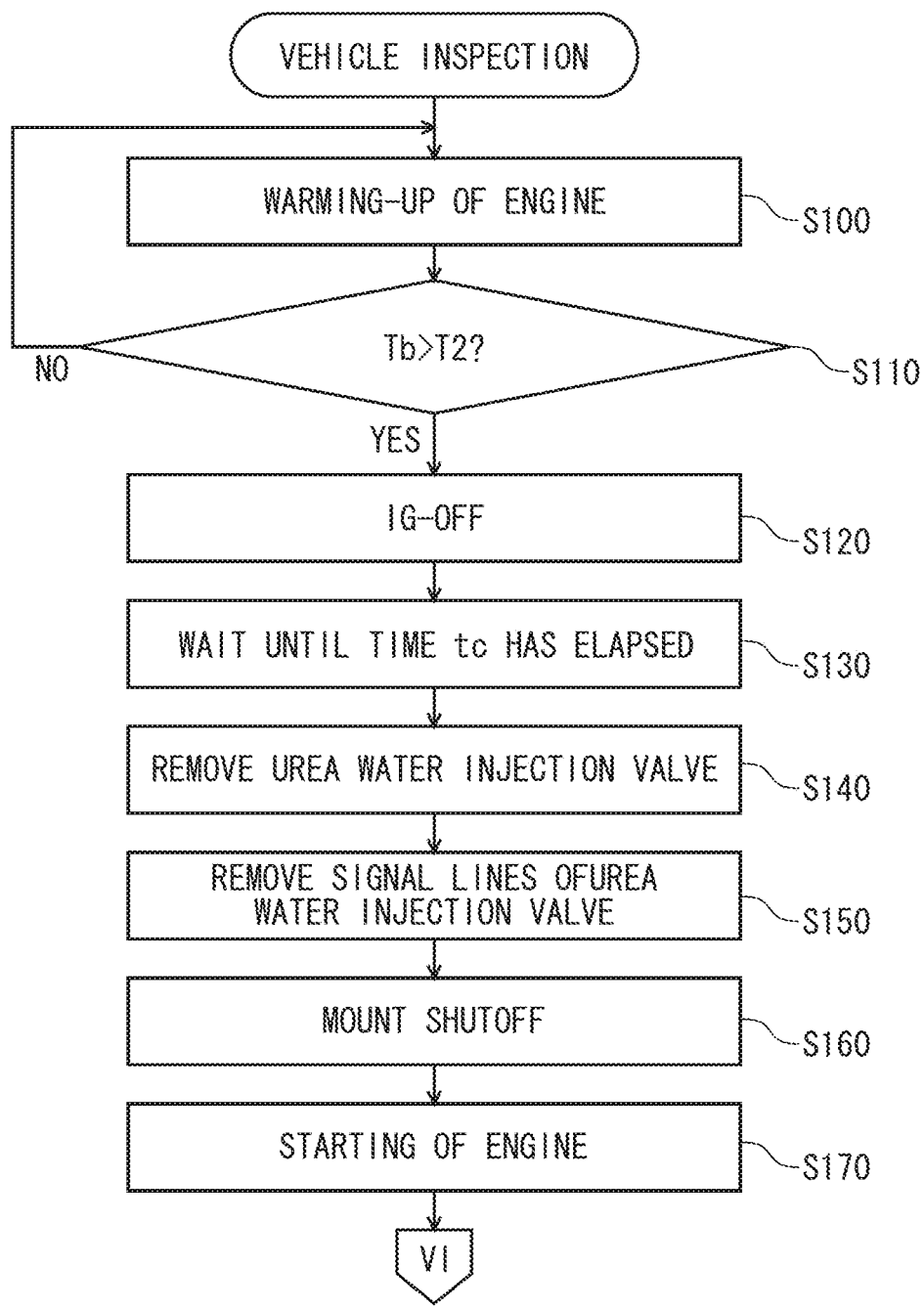
FIG. 5 is a flow chart illustrating another example of the embodiment of the NOx sensor inspection method.

As illustrated in FIG. 5, an inspector performs warming-up of the engine 10 in step S100. Next, in step S110, the inspector determines whether or not a water temperature Tb of a coolant which is acquired by the water temperature sensor 44 is higher than a predetermined threshold T2. The threshold T2 may be, for example, 75 degrees. In step S110, when the water temperature Tb is lower than or equal to the threshold T2, the process returns to step S100. Meanwhile, in step S110, when the water temperature Tb exceeds the threshold T2, the process proceeds to step S120.

Next, in step S120, the inspector turns off an ignition key. Next, in step S130, the inspector waits until a predetermined time tc has elapsed. The time tc may be, for example, 3 minutes or longer and 10 minutes or shorter. As the inspector waits until the time tc has elapsed, after-run of the engine 10 can be reliably prevented.

Next, in step S140, the inspector removes the urea water injection valve 33. Next, in step S150, the inspector removes the electronic control signal lines of the urea water injection valve 33. When the communication line with the DCU 42 is connected although the urea water injection valve 33 is removed from the exhaust passage 23, urea water is injected during the high-temperature exhaust driving D1. Therefore, the electronic control signal lines are removed. Next, in step S160, the inspector mounts a shutoff to shut a place in which the urea water injection valve 33 is removed. Next, in step S170, the inspector restarts the engine 10.

Steps S100 to S160 above are performed, and thereby the state in which the new ammonia is not supplied to the SCR catalyst 34 is obtained.

Figure 6:
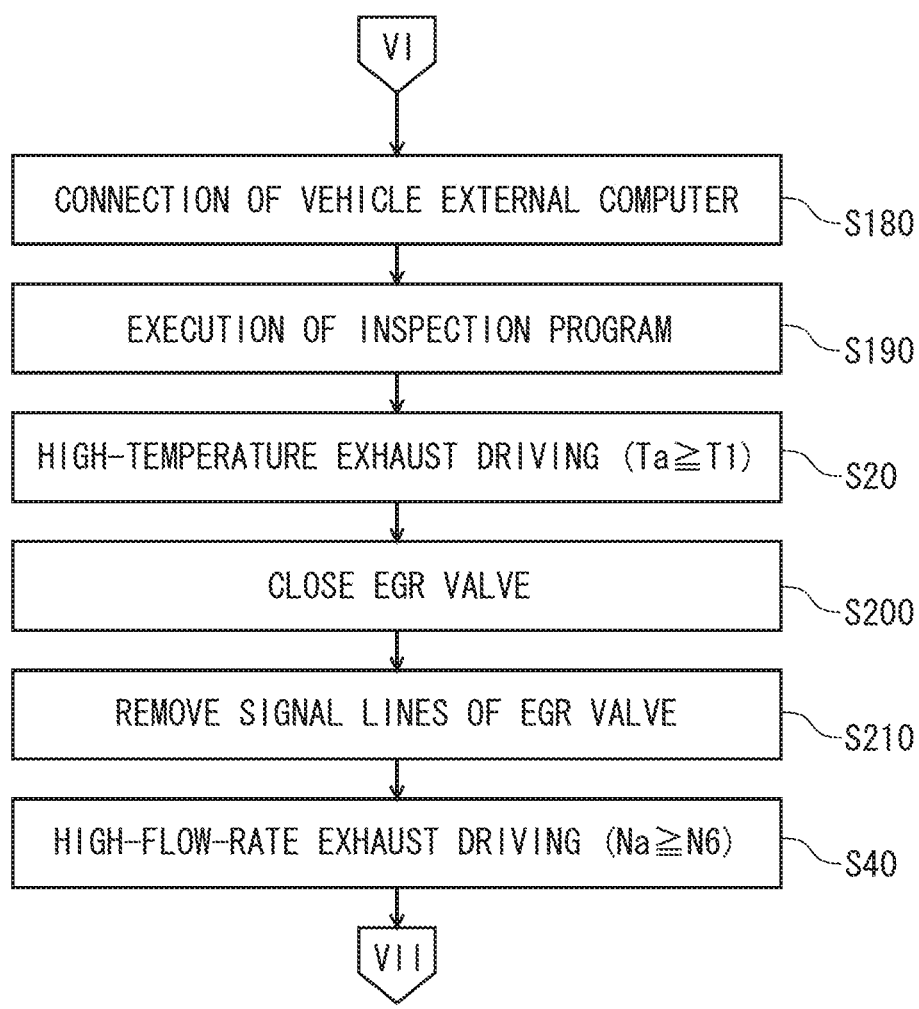
FIG. 6 is a flow chart following VI of FIG. 5.

As illustrated in FIG. 6, next, in step S180, the inspector connects the communication device 51 to the DCU 42, and connects the ECU 40 of the vehicle 1 and the vehicle external computer 52. Next, in step S190, the inspector executes the inspection program 60 stored in the vehicle external computer 52.

Next, step S20 is performed. When step S20 is completed, the inspection program 60 performs a process of closing the EGR valve 27 on the ECM 41 in step S200. Next, in step S210, the inspector removes the electronic control signal lines of the EGR valve 27. At this point, the inspection program 60 may perform a process of displaying an instruction on a screen of the vehicle external computer 52 on the vehicle external computer 52 to cause the inspector to remove the electronic control signal lines of the EGR valve 27. After the inspector removes the electronic control signal lines of the EGR valve 27 and then is forced to input the removal into the vehicle external computer 52, the inspection program 60 may be configured to perform the following step.

Next, step S40 is performed. When step S40 is completed, the process proceeds to steps S50 to S70 of FIG. 7. When step S50 is performed first, the determination speed Nx is set to the no-load highest speed N5.

Figure 7:
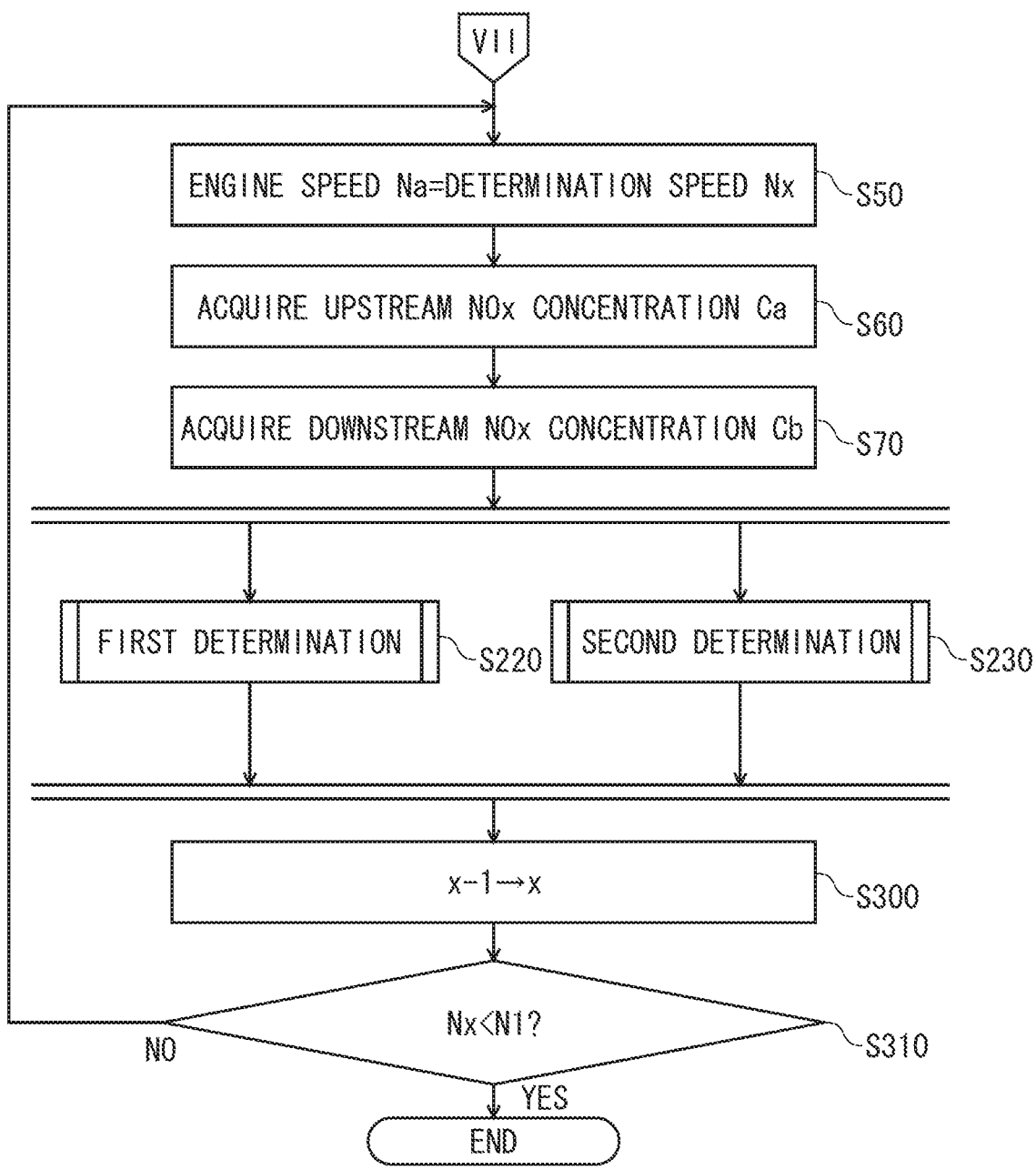
FIG. 7 is a flow chart following VII of FIG. 6.
Figure 8:
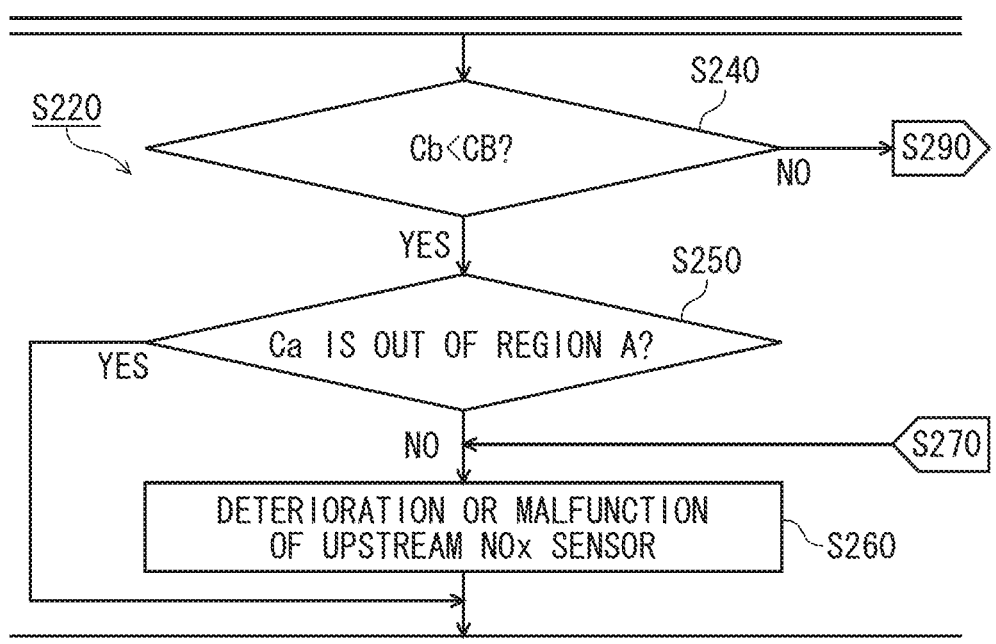
FIG. 8 is a flow chart illustrating first determination of FIG. 7.

As illustrated in FIG. 7, when steps S50 to S70 are completed, the inspection program 60 performs a process of first determination shown in FIG. 8 on the vehicle external computer 52 as parallel processing in step S220. In step S230, the inspection program 60 performs a process of second determination shown in FIG. 9 on the vehicle external computer 52. In this embodiment, steps S220 and S230 are processed in parallel, but steps S220 and S230 may be processed in series.

As illustrated in FIG. 8, in the first determination, the inspection program 60 performs a process of determining whether or not the detected value Cb at the no-load highest speed N5 is less than the first determination value CB on the vehicle external computer 52 in step S240. In step S240, when the detected value Cb is less than the first determination value CB, the process proceeds to step S250. Meanwhile, when the detected value Cb is more than or equal to the first determination value CB, the process proceeds to step S290 of FIG. 9.

Next, in step S250, the inspection program 60 performs a process of determining whether or not the detected value Ca at the no-load highest speed N5 is the value out of the upstream determination region A shown in FIG. 4 on the vehicle external computer 52. In step S240, when the detected value Ca is the value out of the upstream determination region A, the process proceeds to step S300 of FIG. 7. Meanwhile, in step S240, when the detected value Ca is a value within the upstream determination region A, the process proceeds to step S260. Next, in step S260, the inspection program 60 performs a process of determining that the upstream NOx sensor 47 is subjected to deterioration or malfunction on the vehicle external computer 52, and the process proceeds to step S300.

Figure 9:
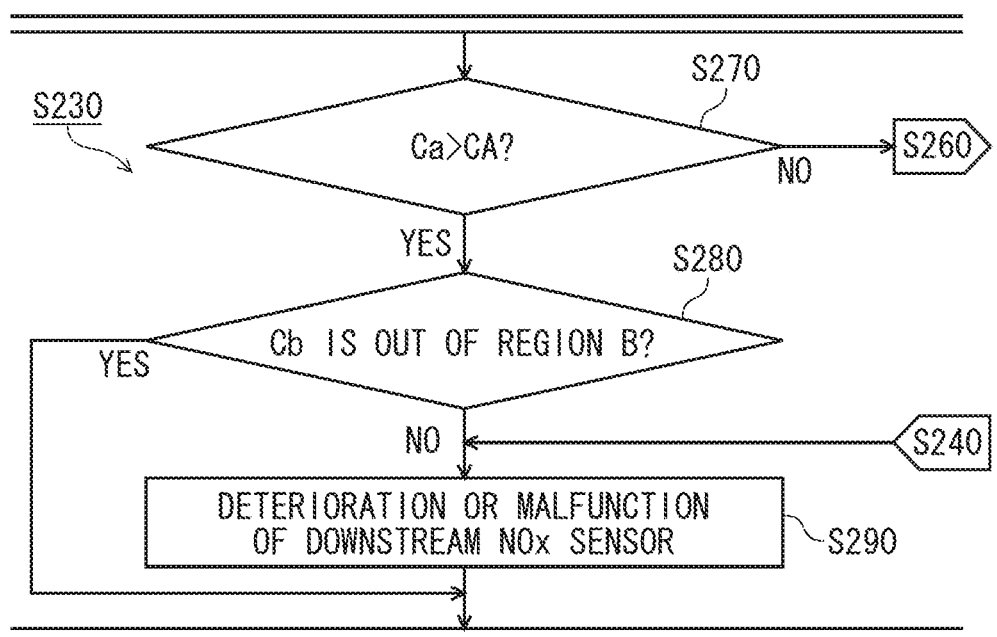
FIG. 9 is a flow chart illustrating second determination of FIG. 7.

As illustrated in FIG. 9, in the second determination, the inspection program 60 performs a process of determining whether or not the detected value Ca at the no-load highest speed N5 exceeds the second determination value CA on the vehicle external computer 52 in step S270. In step S270, when the detected value Ca exceeds the second determination value CA, the process proceeds to step S280. Meanwhile, when the detected value Ca is less than or equal to the second determination value CA, the process proceeds to step S260 of FIG. 8.

Next, in step S280, the inspection program 60 performs a process of determining whether or not the detected value Cb at the no-load highest speed N5 is the value out of the downstream determination region B shown in FIG. 4 on the vehicle external computer 52. In step S280, when the detected value Cb is the value out of the downstream determination region B, the process proceeds to step S300 of FIG. 7. Meanwhile, in step S280, when the detected value Cb is a value within the downstream determination region B, the process proceeds to step S290. Next, in step S290, the inspection program 60 performs a process of determining that the downstream NOx sensor 48 is subjected to deterioration or malfunction on the vehicle external computer 52, and the process proceeds to step S300.

As illustrated in FIG. 7, in step S300, the inspection program 60 performs a process of setting a value of a variable x minus "1" to the next variable on the vehicle external computer 52. Since a variable set first is "5," the next variable is "4." That is, the third speed N4 is used as the determination speed Nx. Next, in step S310, the inspection program 60 performs a process of determining whether or not the determination speed Nx is lower than the idle speed N1 on the vehicle external computer 52. In step S310, when the determination speed Nx is higher than or equal to the idle speed N1, the process returns to step S50, and steps S50 to S300 are performed by setting the determination speed Nx to the third speed N4. In this way, the deterioration or the malfunction of the upstream and downstream NOx sensors 47 and 48 is determined by repeating the no-load highest speed N5, third speed N4, the second speed N3, the first speed N2, and the idle speed N1. In step S300, when the variable x becomes zero, the determination speed Nx is lower than the idle speed N1 in step S310, and this inspection method is completed.

In this way, according to the inspection program 60 and the inspection method of this disclosure, when the vehicle 1 is inspected by the vehicle inspection equipment 50, the circumstances under which the reduction action caused by the ammonia does not occur under the SCR catalyst 34 that cannot be produced during the traveling of the vehicle 1 are produced to determine the deterioration or the malfunction of the upstream and downstream NOx sensors 47 and 48. Thus, the accuracy of the determination of the deterioration or the malfunction can be improved, and the NOx sensors subjected to no malfunction can be prevented from being replaced by mistake.

The vehicle external computer 52 in which the inspection program 60 is stored is provided for the vehicle inspection equipment 50. Thereby, when the vehicle 1 is inspected, the deterioration of the NOx sensors can be determined with high accuracy, and the preventive maintenance of the NOx sensors is advanced. Thus, a reduction in operating rate of the vehicle 1 which is associated with the malfunction of the NOx sensors can be suppressed.

This application is based upon and claims the benefit of priority from Japanese Patent Application No. 2015-108600, filed on May 28, 2015, the entire contents of which are incorporated herein by reference.

INDUSTRIAL APPLICABILITY

The NOx sensor inspection program, the vehicle inspection equipment, the NOx sensor inspection method, and the recording medium of the present invention have an effect that the deterioration or the malfunction of the NOx sensors can be accurately determined to prevent the NOx sensors subjected to neither deterioration nor malfunction from being replaced by mistake, and are useful in that a reduction in operating rate of the vehicle which is associated with the deterioration or the malfunction of the NOx sensors can be suppressed.

REFERENCE SIGNS LIST

1: Vehicle
10: Engine
23: Exhaust passage
30: Exhaust emission control system
31: Oxidation catalyst
32: Trapping device
33: Urea water injection valve
34: SCR catalyst
40: ECU
45: Engine speed sensor
47: Upstream NOx sensor
48: Downstream NOx sensor
49: Exhaust temperature sensor
50: Vehicle inspection equipment
51: Communication device
52: Vehicle external computer
60: Inspection program
A: Upstream determination region
B: Downstream determination region
Ca, Cb: Detected value
D1: High-temperature exhaust driving
D2: High-flow-rate exhaust driving
N1: Idle speed
N5: No-load highest speed
N6: High speed
Na: Engine speed
Nx: Determination speed
T1: High temperature

DRAWINGS

FIG. 2
VEHICLE INSPECTION
S10: STOP INJECTION OF UREA WATER
S20: HIGH-TEMPERATURE EXHAUST DRIVING (Ta≤T1)
S30: CLOSE EGR VALVE
S40: HIGH-FLOW-RATE EXHAUST DRIVING (Na≥N6)
S50: ENGINE SPEED Na=DETERMINATION SPEED Nx
S60: ACQUIRE UPSTREAM NOx CONCENTRATION Ca
S70: ACQUIRE DOWNSTREAM NOx CONCENTRATION Cb
S80: DETERMINE DETERIORATION OR MALFUNCTION OF EACH SENSOR
END
FIG. 3
NOx CONCENTRATION
ENGINE SPEED
FIG. 4
NOx CONCENTRATION
ENGINE SPEED
FIG. 5
VEHICLE INSPECTION
S100: WARMING-UP OF ENGINE
S130: WAIT UNTIL TIME tc HAS ELAPSED
S140: REMOVE UREA WATER INJECTION VALVE
S150: REMOVE SIGNAL LINES OF UREA WATER INJECTION VALVE
S160: MOUNT SHUTOFF
S170: STARTING OF ENGINE
FIG. 6
S180: CONNECTION OF VEHICLE EXTERNAL COMPUTER
S190: EXECUTION OF INSPECTION PROGRAM
S20: HIGH-TEMPERATURE EXHAUST DRIVING (Ta≥T1)
S200: CLOSE EGR VALVE
S210: REMOVE SIGNAL LINES OF EGR VALVE
S40: HIGH-FLOW-RATE EXHAUST DRIVING (Na≥N6)

FIG. 7
S50: ENGINE SPEED Na=DETERMINATION SPEED Nx
S60: ACQUIRE UPSTREAM NOx CONCENTRATION Ca
S70: ACQUIRE DOWNSTREAM NOx CONCENTRATION Cb
S220: FIRST DETERMINATION
S230: SECOND DETERMINATION
END
FIG. 8
S250: Ca IS OUT OF REGION A?
S260: DETERIORATION OR MALFUNCTION OF UPSTREAM NOx SENSOR
FIG. 9
S280: Cb IS OUT OF REGION B?
S290: DETERIORATION OR MALFUNCTION OF DOWNSTREAM NOx SENSOR

The invention claimed is:

1. A vehicle external computer for inspecting a vehicle, the vehicle includes:
an upstream NOx sensor disposed upstream from a reduction catalyst disposed in an exhaust passage of an internal combustion engine;
a downstream NOx sensor disposed downstream from the reduction catalyst; and
an ECU connected to the upstream and downstream NOx sensors,
wherein the vehicle external computer comprises:
a processor; and
a memory storing computer-readable instructions that, when executed by the processor during an inspection of the vehicle in a state where the vehicle external computer is connected to the ECU of the vehicle, causes the vehicle external computer to perform:
controlling the ECU to perform a high-temperature exhaust driving process of causing the internal combustion engine to perform high-temperature exhaust driving for setting a temperature of exhaust gas to be higher than or equal to a predetermined high temperature after a reductant from a reductant injection valve is not supplied to the reduction catalyst;
controlling the ECU to perform a high-flow-rate exhaust driving process of causing the internal combustion engine to perform high-flow-rate exhaust driving for setting a speed of internal combustion engine to be more than or equal to a predetermined high speed after a flow rate of the exhaust gas is not reduced after the high-temperature exhaust driving process is performed;
acquiring detected values of the upstream and downstream NOx sensors when the speed of internal combustion engine is the predetermined determination speed after the high-flow-rate exhaust driving process is performed on the ECU; and
determining deterioration or malfunction of the upstream and downstream NOx sensors based on the detected values.

2. The vehicle external computer according to claim 1, wherein the high-temperature exhaust driving is set to either driving during purge control for recovering a function of the reduction catalyst or driving during reproduction control for recovering a function of a trapping device disposed upstream from the reduction catalyst.

3. The vehicle external computer according to claim 1, wherein the high-flow-rate exhaust driving is set to driving for setting the speed of internal combustion engine to a no-load highest speed.

4. The vehicle external computer according to claim 1, wherein computer-readable instructions that, when executed by the processor during an inspection of the vehicle in a state where the vehicle external computer is connected to the ECU of the vehicle, causes the vehicle external computer to perform:
continuing the high-temperature exhaust driving until a first time required to desorb the reductant from the reduction catalyst has elapsed; and
continuing the high-flow-rate exhaust driving until a second time required to discharge the reductant from the exhaust passage has elapsed are performed on the in-vehicle computer.

5. The vehicle external computer according to claim 1, wherein the determining process includes:
determining whether or not the detected value of the upstream NOx sensor at the determination speed is a value out of an upstream determination region set by the detected value of the downstream NOx sensor, and whether or not the detected value of the downstream NOx sensor at the determination speed is a value out of a downstream determination region set by the detected value of the upstream NOx sensor; and
determining that the upstream NOx sensor undergoes the deterioration or the malfunction when the detected value of the upstream NOx sensor is a value within the upstream determination region, determining that the downstream NOx sensor undergoes the deterioration or the malfunction when the detected value of the downstream NOx sensor is a value within the downstream determination region, and determining that the upstream NOx sensor and the downstream NOx sensor are subjected to neither deterioration nor malfunction when the detected value of the upstream NOx sensor is the value out of the upstream determination region and when the detected value of the downstream NOx sensor is the value out of the downstream determination region.

6. The vehicle external computer according to claim 5, wherein the determining process includes:
determining whether or not the detected value of the downstream NOx sensor at the determination speed is less than a preset first determination value, and to determine whether or not the detected value of the upstream NOx sensor is the value out of the upstream determination region when the detected value of the downstream NOx sensor is less than the first determination value; and
determining whether or not the detected value of the upstream NOx sensor at the determination speed exceeds a preset second determination value, and to determine whether or not the detected value of the downstream NOx sensor is the value out of the downstream determination region when the detected value of the upstream NOx sensor exceeds the second determination value.

7. A NOx sensor inspection method by which, during inspection of a vehicle in which an internal combustion engine, in which an upstream NOx sensor and a downstream NOx sensor are disposed upstream and downstream from a reduction catalyst disposed in an exhaust passage, and an in-vehicle computer, which is connected to each of the upstream and downstream NOx sensors, are mounted, deterioration or malfunction of each of the upstream and downstream NOx sensors is inspected, the NOx sensor inspection method comprising:

using driving of the internal combustion engine as high-temperature exhaust driving for setting a temperature of exhaust gas to be higher than or equal to a predetermined high temperature after a reductant from a reductant injection valve is not supplied to the reduction catalyst;

using driving of the internal combustion engine as high-flow-rate exhaust driving for setting a speed of internal combustion engine to be more than or equal to a predetermined high speed after a flow rate of the exhaust gas is not reduced;

acquiring detected values of the upstream and downstream NOx sensors when the speed of internal combustion engine is the predetermined determination speed; and determining the deterioration or the malfunction of the upstream and downstream NOx sensors based on the detected values.

8. The NOx sensor inspection method according to claim 7, wherein a step of setting the high-temperature exhaust driving after the reductant injection valve is removed from the internal combustion engine is performed.

9. The NOx sensor inspection method according to claim 7, wherein the high-flow-rate exhaust driving is performed after an EGR valve disposed in an EGR passage connected to an intake passage is removed from the exhaust passage of the internal combustion engine.

10. A non-transitory recording medium in which a computer program for a vehicle external computer connected to an ECU during inspection of a vehicle is recorded, the vehicle including: an upstream NOx sensor disposed upstream from a reduction catalyst disposed in an exhaust passage of an internal combustion engine; a downstream NOx sensor disposed downstream from the reduction catalyst; and the ECU connected to the upstream and downstream NOx sensors, wherein the computer program, when executed by the vehicle external computer, causes the vehicle external computer to perform a series of processed comprising:

controlling the ECU to perform a high-temperature exhaust driving process of causing the internal combustion engine to perform high-temperature exhaust driving for setting a temperature of exhaust gas to be higher than or equal to a predetermined high temperature after a reductant from a reductant injection valve is not supplied to the reduction catalyst;

controlling the ECU to perform a high-flow-rate exhaust driving process of causing the internal combustion engine to perform high-flow-rate exhaust driving for setting a speed of internal combustion engine to be more than or equal to a predetermined high speed after a flow rate of the exhaust gas is not reduced after the high-temperature exhaust driving process is performed;

acquiring detected values of the upstream and downstream NOx sensors when the speed of internal combustion engine is the predetermined determination speed after the high-flow-rate exhaust driving process is performed on the ECU; and determining deterioration or malfunction of the upstream and downstream NOx sensors based on the detected values.

* * * * *